United States Patent
Prusty et al.

(10) Patent No.: US 8,536,247 B2
(45) Date of Patent: *Sep. 17, 2013

(54) POLYAMIDE RESISTANT TO HEAT AGING

(75) Inventors: Manoranjan Prusty, Mannheim (DE); Martin Baumert, Dossenheim (DE); Axel Wilms, Frankenthal (DE); Philippe Desbois, Edingen-Neckarhausen (DE); Alexander Traut, Schriesheim (DE); Gerald Lippert, Lampertheim (DE); Jordan Kurikov, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/504,299

(22) PCT Filed: Oct. 18, 2010

(86) PCT No.: PCT/EP2010/065582
§ 371 (c)(1),
(2), (4) Date: Apr. 26, 2012

(87) PCT Pub. No.: WO2011/051123
PCT Pub. Date: May 5, 2011

(65) Prior Publication Data
US 2012/0214904 A1    Aug. 23, 2012

(30) Foreign Application Priority Data

Oct. 27, 2009 (EP) .................... 09174173
May 17, 2010 (EP) .................... 10162960

(51) Int. Cl.
C08K 9/08 (2006.01)
C08K 9/00 (2006.01)

(52) U.S. Cl.
USPC ........... 523/200; 523/216; 524/435; 156/73.5

(58) Field of Classification Search
USPC .............. 524/435; 523/200, 216; 156/73.5
See application file for complete search history.

(56) References Cited

U.S. PATENT DOCUMENTS

| 4,305,865 | A | * | 12/1981 | Okada et al. | 524/423 |
|---|---|---|---|---|---|
| 4,764,429 | A | * | 8/1988 | Mair | 428/403 |
| 5,843,329 | A | | 12/1998 | Deetz | |
| 5,853,831 | A | * | 12/1998 | Urabe et al. | 428/35.7 |
| 6,180,235 | B1 | * | 1/2001 | Leutner et al. | 428/402 |
| 8,268,920 | B2 | * | 9/2012 | Prusty et al. | 524/440 |
| 2003/0235666 | A1 | | 12/2003 | Buhler | |
| 2008/0210463 | A1 | * | 9/2008 | Maas et al. | 174/388 |
| 2010/0045120 | A1 | * | 2/2010 | Kitano et al. | 310/44 |
| 2011/0009566 | A1 | | 1/2011 | Jain et al. | |
| 2012/0004353 | A1 | | 1/2012 | Prusty et al. | |

FOREIGN PATENT DOCUMENTS

| EP | 1369447 A1 | 12/2003 |
|---|---|---|
| EP | 1498445 A1 | 1/2005 |
| EP | 1681313 A1 | 7/2006 |
| WO | WO-2008080869 A2 | 7/2008 |
| WO | WO-2009077492 A2 | 6/2009 |
| WO | WO-2011051121 A1 | 5/2011 |
| WO | WO-2011051123 A1 | 5/2011 |

OTHER PUBLICATIONS

Lexikon Rompp Online, Version 2,8, Thieme-Veriag, 2006, Stichwort: "Nigorsin".
Houben-Weyl, Methoden der oganischen Chemie, Bd. 14/1, Georg-Thieme-Verlag, Stuttgart, 1961, pp. 392-406.
International Search Report for PCT/EP2010/065582 mailed Apr. 1, 2011.
International Preliminary Report on Patentability for PCT/EP2010/065582 mailed Feb. 2, 2012.

* cited by examiner

Primary Examiner — Hannah Pak
(74) Attorney, Agent, or Firm — Novak Druce Connolly Bove + Quigg LLP

(57) ABSTRACT

Thermoplastic molding compositions, comprising
A) from 10 to 99.999% by weight of a polyimide
B) from 0.001 to 20% by weight of iron powder with a particle size of at most 10 μm ($d_{50}$ value), which is obtainable via thermal decomposition of pentacarbonyliron,
C) from 0 to 70% by weight of further additives,
where the total of the percentages by weight of components A) to C) is 100%.

11 Claims, No Drawings

POLYAMIDE RESISTANT TO HEAT AGING

CROSS-REFERENCE TO RELATED APPLICATIONS

This application is a national stage application (under 35 U.S.C. §371) of PCT/EP2010/065582, filed Oct. 18, 2010, which claims benefit of European application 09174173.6, filed Oct. 27, 2009, and European application 10162960.8, filed May 17, 2010.

The invention relates to thermoplastic molding compositions, comprising
A) from 10 to 99.999% by weight of a polyamide,
B) from 0.001 to 20% by weight of iron powder with a particle size of at most 10 μm ($d_{50}$ value), which is obtainable via thermal decomposition of pentacarbonyliron,
C) from 0 to 70% by weight of further additives,
where the total of the percentages by weight of components A) to C) is 100%.

The invention further relates to the use of the molding compositions of the invention for the production of fibers, foils, and moldings of any kind, and also to the resultant moldings.

Thermoplastic polyamides, such as PA6 and PA66, are often used in the form of glassfiber-reinforced molding compositions as materials in the design of components which during their lifetime have exposure to elevated temperatures, with thermooxidative degradation. Although the thermooxidative degradation can be delayed by adding known heat stabilizers it cannot be prevented in the long term, and becomes apparent by way of example in a reduced level of mechanical properties. It is highly desirable to improve the heat-aging resistance (HAR) of polyamides, since this can achieve longer lifetimes for components subject to thermal stress, or can reduce the risk that these will fail. As an alternative, an improved HAR can also permit the use of the components at higher temperatures.

The use of elemental iron powder in polyamides is disclosed in DE-A 26 02 449, JP-A 09/221590, JP-A 2000/86889 (in each case as filler), JP-A 2000/256 123 (as decorative addition), and also WO 2006/074912 and WO 2005/007727 (stabilizers).

EP-A 1 846 506 discloses a combination of Cu-containing stabilizers with iron oxides for polyamides.

The heat-aging resistance of the known molding compositions remains inadequate, in particular over prolonged periods of thermal stress.

The surface of the moldings is not entirely satisfactory, since heat-aging causes porosity, and also blistering.

The more recent EP application, file reference: 08171803.3, proposes combinations of polyethyleneimines with iron powder to improve HAR.

It was therefore an object of the present invention to provide thermoplastic polyamide molding compositions which have improved HAR and have a good surface after heat-aging, and also good mechanical properties. The intention is to improve processing by means of welding processes, in particular for vibration welding and laser welding processes.

The molding compositions defined in the introduction have accordingly been found. Preferred embodiments are given in the dependent claims.

The molding compositions of the invention comprise, as component A), from 10 to 99.999% by weight, preferably from 20 to 98% by weight, and in particular from 25 to 94% by weight, of at least one polyamide.

The polyamides of the molding compositions of the invention generally have an intrinsic viscosity of from 90 to 350 ml/g, preferably from 110 to 240 ml/g, determined in a 0.5% strength by weight solution in 96% strength by weight sulfuric acid at 25° C. to ISO 307.

Preference is given to semicrystalline or amorphous resins with a molecular weight (weight average) of at least 5 000, described by way of example in the following U.S. Pat. Nos. 2,071,250, 2,071,251, 2,130,523, 2,130,948, 2,241,322, 2,312,966, 2,512,606, and 3,393,210.

Examples of these are polyamides that derive from lactams having from 7 to 13 ring members, e.g. polycaprolactam, polycaprylolactam, and polylaurolactam, and also polyamides obtained via reaction of dicarboxylic acids with diamines.

Dicarboxylic acids which may be used are alkanedicarboxylic acids having 6 to 12, in particular 6 to 10, carbon atoms, and aromatic dicarboxylic acids. Merely as examples, those that may be mentioned here are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine (e.g. Ultramid® X17 from BASF SE, where the molar ratio of MXDA to adipic acid is 1:1), di(4-aminophenyl)methane, di(4-aminocyclohexyl)methane, 2,2-di(4-aminophenyl)propane, 2,2-di(4-amino-cyclohexyl)propane, and 1,5-diamino-2-methylpentane.

Preferred polyamides are polyhexamethyleneadipamide, polyhexamethylene-sebacamide, and polycaprolactam, and also nylon-6/6,6 copolyamides, in particular having a proportion of from 5 to 95% by weight of caprolactam units (e.g. Ultramid® C31 from BASF SE).

Other suitable polyamides are obtainable from w-aminoalkyinitriles, e.g. amino-capronitrile (PA 6) and adipodinitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable examples are polyamides obtainable via copolymerization of two or more of the abovementioned monomers, and mixtures of two or more polyamides in any desired mixing ratio. Particular preference is given to mixtures of nylon-6,6 with other polyamides, in particular nylon-6/6,6 copolyamides.

Other copolyamides which have proven particularly advantageous are semiaromatic copolyamides, such as PA 6/6T and PA 66/6T, where the triamine content of these is less than 0.5% by weight, preferably less than 0.3% by weight (see EP-A 299 444). Other polyamides resistant to high temperatures are known from EP-A 19 94 075 (PA 6T/6I/MXD6).

The processes described in EP-A 129 195 and 129 196 can be used to prepare the preferred semiaromatic copolyamides with low triamine content.

The following list, which is not comprehensive, comprises the polyamides A) mentioned and other polyamides A) for the purposes of the invention, and the monomers comprised:
AB Polymers:
PA 4 Pyrrolidone
PA 6 ε-Caprolactam
PA 7 Ethanolactam
PA 8 Caprylolactam PA 9 9-Aminopelargonic acid
PA 11 11-Aminoundecanoic acid
PA 12 Laurolactam
AA/BB polymers:
PA 46 Tetramethylenediamine, adipic acid
PA 66 Hexamethylenediamine, adipic acid
PA 69 Hexamethylenediamine, azelaic acid
PA 610 Hexamethylenediamine, sebacic acid
PA 612 Hexamethylenediamine, decanedicarboxylic acid
PA 613 Hexamethylenediamine, undecanedicarboxylic acid
PA 1212 1,12-Dodecanediamine, decanedicarboxylic acid
PA 1313 1,13-Diaminotridecane, undecanedicarboxylic acid
PA 6T Hexamethylenediamine, terephthalic acid
PA 9T 1,9-Nonanediamine, terephthalic acid
PA MXD6 m-Xylylenediamine, adipic acid
AA/BB Polymers:
PA 6I Hexamethylenediamine, isophthalic acid
PA 6-3-T Trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA PACM 12 Diaminodicyclohexylmethane, laurolactam
PA 6I/6T/PACM as PA 6I/6T+diaminodicyclohexylmethane
PA 12/MACMI Laurolactam, dimethyldiaminodicyclohexylmethane, isophthalic acid
PA 12/MACMT Laurolactam, dimethyldiaminodicyclohexylmethane, terephthalic acid
PA PDA-T Phenylenediamine, terephthalic acid The molding compositions of the invention comprise, as component B), from 0.001 to 20% by weight, preferably from 0.05 to 10% by weight, and in particular from 0.1 to 5% by weight, of iron powder with a particle size of at most 10 µm ($d_{50}$ value), which is obtainable via thermal decomposition of pentacarbonyliron.

Iron occurs in a number of allotropes:

α-Fe (ferrite) forms space-centered cubic lattices, is magnetizable, dissolves a small amount of carbon, and occurs in pure iron up to 928° C. At 770° C. (Curie temperature) it loses its ferromagnetic properties and becomes paramagnetic; iron in the temperature range from 770 to 928° C. is also termed β-Fe. At normal temperature and at a pressure of at least 13 000 MPa, α-Fe becomes what is known as ε-Fe with a reduction of about 0.20 cm$^3$/mol in volume, whereupon density increases from 7.85 to 9.1 (at 20 000 MPa).

2. γ-Fe (austenite) forms face-centered cubic lattices, is nonmagnetic, dissolves a large amount of carbon, and is observable only in the temperature range from 928 to 1398° C.

3. δ-Fe, space-centered, exists at from 1398° C. to the melting point of 1539° C.

Metallic iron is generally silver-white, density 7.874 (heavy metal), m.p. 1539° C., boiling point 2880° C.; specific heat (from 18 to 100° C.) about 0.5 g$^{-1}$ K$^{-1}$, tensile strength from 220 to 280 N/mm$^2$. The values apply to chemically pure iron.

Industrial production of iron uses smelting of iron ores, iron slags, calcined pyrites, or blast-furnace dust, and resmelting of scrap and alloys.

The iron powder of the invention is produced via thermal decomposition of pentacarbonyliron, preferably at temperatures of from 150° C. to 350° C. The particles thus obtainable have preferably spherical shape, therefore being spherical or almost spherical (another term used being spherolitic).

Preferred iron powder has the particle size distribution described below, and the particle size distribution here is determined by means of laser scattering in a highly diluted aqueous suspension (e.g. using a Beckmann LS13320). The particle size (and distribution) described hereinafter can optionally be obtained via grinding and/or sieving.

$d_{xx}$ here means that XX % of the total volume of the particles is smaller than the stated value.

$d_{50}$ values: at most 10 µm, preferably from 1.6 to 8 µm, in particular from 2.9 to 7.5 µm, very particularly from 3.4 to 5.2 µm $d_{10}$ values: preferably from 1 to 5 µm, in particular from 1 to 3 µm, and very particularly from 1.4 to 2.7 µm $d_{90}$ values: preferably from 3 to 35 µm, in particular from 3 to 12 µm, and very particularly from 6.4 to 9.2 µm.

Component B) preferably has iron content of from 97 to 99.8 g/100 g, preferably from 97.5 to 99.6 g/100 g. Content of other metals is preferably below 1000 ppm, in particular below 100 ppm, and very particularly below 10 ppm.

Fe content is usually determined via infrared spectroscopy.

C content is preferably from 0.01 to 1.2 g/100 g, preferably from 0.05 to 1.1 g/100 g and especially from 0.4 to 1.1 g/100 g. This C content in the preferred iron powders corresponds to powders which are not reduced with hydrogen after the thermal decomposition process. The C content is usually determined by combustion of the sample in a stream of oxygen and then using IR to detect the resultant $CO_2$ gas (by means of a Leco CS230 or CS-mat 6250 from Juwe) by a method based on ASTM E1019.

Nitrogen content is preferably at most 1.5 g/100 g, preferably from 0.01 to 1.2 g/100 g. Oxygen content is preferably at most 1.3 g/100 g, preferably from 0.3 to 0.65 g/100 g.

N and O are determined via heating of the specimen to about 2100° C. in graphite furnace. The oxygen obtained from the specimen here is converted to CO and measured by way of an IR detector. The N liberated under the reaction conditions from the N-containing compounds is discharged with the carrier gas and detected and recorded by means of TCD (Thermal Conductivity Detector) (both methods being based on ASTM E1019).

Tap density is preferably from 2.5 to 5 g/cm$^3$, in particular from 2.7 to 4.4 g/cm$^3$. This generally means the density when the powder is, for example, charged to the container and compacted by vibration. Iron powder to which further preference is given can have been surface-coated with iron phosphate, with iron phosphite, or with $SiO_2$.

BET surface area to DIN ISO 9277 is preferably from 0.1 to 10 m$^2$/g, in particular from 0.1 to 5 m$^2$/g, preferably from 0.2 to 1 m$^2$/g and in particular from 0.4 to 1 m$^2$/g.

In order to achieve particularly good dispersion of the iron particles, a masterbatch may be used, involving a polymer. Suitable polymers for this purpose are polyolefins, polyesters, or polyamides, and it is preferable here that the masterbatch polymer is the same as component A). The mass fraction of the iron in the polymer is generally from 15 to 80% by mass, preferably from 20 to 40% by mass.

The molding compositions of the invention can comprise, as component C), up to 70% by weight, preferably up to 50% by weight, of further additives.

Fibrous or particulate fillers C1) that may be mentioned are carbon fibers, glass fibers, glass beads, amorphous silica, calcium silicate, calcium metasilicate, magnesium carbonate, kaolin, chalk, powdered quartz, mica, barium sulfate, and feldspar, and the amounts of these that can be used are from 1 to 50% by weight, in particular from 1 to 40% by weight, preferably from 10 to 40% by weight.

Preferred fibrous fillers that may be mentioned are carbon fibers, aramid fibers, and potassium titanate fibers, particular preference being given to glass fibers in the form of E glass. These can be used as rovings or in the commercially available forms of chopped glass.

The fibrous fillers may have been surface-pretreated with a silane compound to improve compatibility with the thermoplastic.

Suitable silane compounds have the general formula:

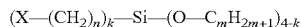

where the definitions of the substituents are as follows:
X NH$_2$—,

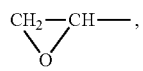

HO—,
n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxy-silane, aminopropyltriethoxysilane and aminobutyltriethoxysilane, and also the corresponding silanes which comprise a glycidyl group as substituent X.

The amounts of the silane compounds generally used for surface-coating are from 0.01 to 2% by weight, preferably from 0.025 to 1.0% by weight and in particular from 0.05 to 0.5% by weight (based on C)).

Long glass fibers are also suitable as component C1), and can be used in the form of roving. The glass fibers used in the form of roving in the invention have a diameter of from 6 to 20 μm, preferably from 10 to 18 μm, and the cross section of the glass fibers here is round, oval, or polygonal. In particular, the invention uses E glass fibers. However, it is also possible to use any other types of glass fiber, e.g. A, C, D, M, S, or R glass fibers, or any desired mixture thereof, or a mixture with E glass fibers. The L/D (length/diameter) ratio is preferably from 100 to 4000, in particular from 350 to 2000, and very particularly from 350 to 700.

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may optionally have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder. Addition of the lamellar or acicular nanofillers to the inventive nanocomposites gives a further increase in mechanical strength.

The molding compositions of the invention can comprise, as component C2), from 0.05 to 3% by weight, preferably from 0.1 to 1.5% by weight, and in particular from 0.1 to 1% by weight, of a lubricant.

Preference is given to the salts of Al, of alkali metals, or of alkaline earth metals, or esters or amides of fatty acids having from 10 to 44 carbon atoms, preferably having from 12 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The molding compositions of the invention can comprise, as component C3), from 0.05 to 3% by weight, preferably from 0.1 to 1.5% by weight, and in particular from 0.1 to 1% by weight, of a copper stabilizer, preferably of a Cu(I) halide, in particular in a mixture with an alkali metal halide, preferably KI, in particular in the ratio 1:4, or of a sterically hindered phenol, or a mixture of these.

Preferred salts of monovalent copper used are cuprous acetate, cuprous chloride, cuprous bromide, and cuprous iodide. The materials comprise these in amounts of from 5 to 500 ppm of copper, preferably from 10 to 250 ppm, based on polyamide.

The advantageous properties are in particular obtained if the copper is present with molecular distribution in the polyamide. This is achieved if a concentrate comprising the polyamide, and comprising a salt of monovalent copper, and comprising an alkali metal halide in the form of a solid, homogeneous solution is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogeneous solution is preferably from 0.3 to 3% by weight, in particular from 0.5 to 2% by weight, based on the total weight of the solution, and the molar ratio of cuprous iodide to potassium iodide is from 1 to 11.5, preferably from 1 to 5.

Suitable polyamides for the concentrate are homopolyamides and copolyamides, in particular nylon-6 and nylon-6,6.

Suitable sterically hindered phenols C3) are in principle all of the compounds which have a phenolic structure and which have at least one bulky group on the phenolic ring.

It is preferable to use, for example, compounds of the formula

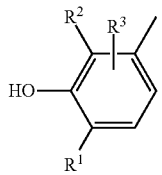

where:
$R^1$ and $R^2$ are an alkyl group, a substituted alkyl group, or a substituted triazole group, and where the radicals $R^1$ and $R^2$ may be identical or different, and $R^3$ is an alkyl group, a substituted alkyl group, an alkoxy group, or a substituted amino group.

Antioxidants of the abovementioned type are described by way of example in DE-A 27 02 661 (U.S. Pat. No. 4,360,617).

Another group of preferred sterically hindered phenols is provided by those derived from substituted benzenecarboxylic acids, in particular from substituted benzenepropionic acids.

Particularly preferred compounds from this class are compounds of the formula

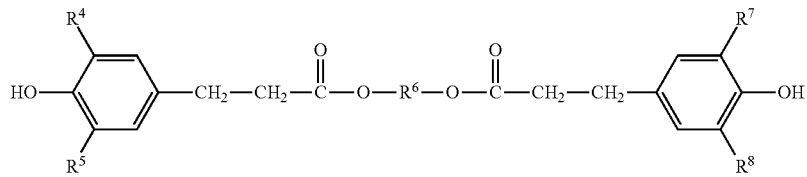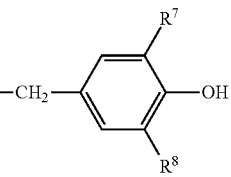

where $R^4$, $R^5$, $R^7$, and $R^8$, independently of one another, are $C_1$-$C_8$-alkyl groups which themselves may have substitution (at least one of these being a bulky group), and $R^8$ is a divalent aliphatic radical which has from 1 to 10 carbon atoms and whose main chain may also have C—O bonds.

Preferred compounds corresponding to these formulae are

All of the following should be mentioned as examples of sterically hindered phenols:
2,2'-methylenebis(4-methyl-6-tent-butylphenol), 1,6-hexanediol bis[3-(3,5-di-tert-butyl-4-hydroxyphenyl)propionate], pentaerythrityl tetrakis[3-(3,5-di-tert-butyl-4-hydroxy-phenol)propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxy-benzyl)benzene, 4,4'-methylenebis(2,6-di-tert-butylphenol), 3,5-di-tert-butyl-4-hydroxy-benzyldimethylamine.

Compounds which have proven particularly effective and which are therefore used with preference are 2,2'-methylenebis(4-methyl-6-tert-butylphenyl), 1,6-hexanediol bis(3,5-di-tert-butyl-4-hydroxyphenyl]propionate (Irganox® 259), pentaerythrityl tetrakis[3-(3,5-di-tert-butyl-4-hydroxyphenyl)propionate], and also N,N'-hexamethylene-bis-3,5-di-tert-butyl-4-hydroxyhydrocinnamide (Irganox® 1098), and the product Irganox® 245 described above from Ciba Geigy, which has particularly good suitability.

The amount comprised of the antioxidants C), which can be used individually or as a mixture, is from 0.05 up to 3% by weight, preferably from 0.1 to 1.5% by weight, in particular from 0.1 to 1% by weight, based on the total weight of the molding compositions A) to C).

In some instances, sterically hindered phenols having not more than one sterically hindered group in ortho-position with respect to the phenolic hydroxy group have proven par-

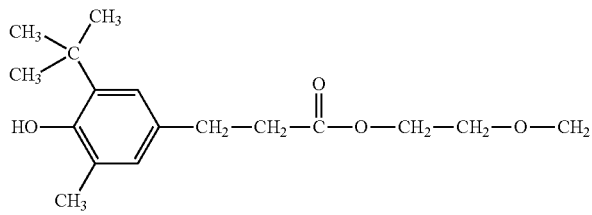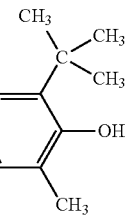

(Irganox® 245 from BASF SE)

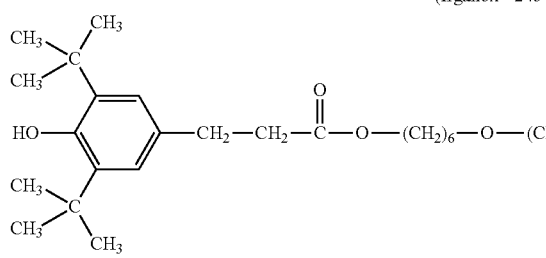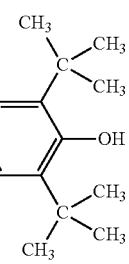

(Irganox® 249 from BASF SE)

ticularly advantageous; in particular when assessing color-fastness on storage in diffuse light over prolonged periods.

The molding compositions of the invention can comprise, as component C4), from 0.05 to 5% by weight, preferably from 0.1 to 2% by weight, and in particular from 0.25 to 1.5% by weight, of a nigrosin.

Nigrosins are generally a group of black or gray phenazine dyes (azine dyes) related to the indulines and taking various forms (water-soluble, oleosoluble, spirit-soluble), used in wool dyeing and wool printing, in black dyeing of silks, and in the coloring of leather, of shoe creams, of varnishes, of plastics, of stoving lacquers, of inks, and the like, and also as microscopy dyes.

Nigrosins are obtained industrially via heating of nitrobenzene, aniline, and aniline hydrochloride with metallic iron and $FeCl_3$ (the name being derived from the Latin niger=black).

Component C4) can be used in the form of free base or else in the form of salt (e.g. hydrochloride).

Further details concerning nigrosins can be found by way of example in the electronic encyclopedia Rompp Online, Version 2.8, Thieme-Verlag Stuttgart, 2006, keyword "Nigrosin".

Examples of other conventional additives C) are amounts of up to 25% by weight, preferably up to 20% by weight, of elastomeric polymers (also often termed impact modifiers, elastomers, or rubbers).

These are very generally copolymers preferably composed of at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, Germany, 1961), pages 392-406, and in the monograph by C. B. Bucknall, "Toughened Plastics" (Applied Science Publishers, London, UK, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenyl-norbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM rubbers and EPDM rubbers may preferably also have been grafted with reactive carboxylic acids or with derivatives of these. Examples of these are acrylic acid, methacrylic acid and derivatives thereof, e.g. glycidyl(meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formulae I or II or III or IV

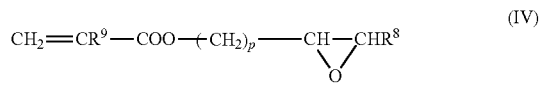

where $R^1$ to $R^9$ are hydrogen or alkyl groups having from 1 to 6 carbon atoms, and m is a whole number from 0 to 20, g is a whole number from 0 to 10 and p is a whole number from 0 to 5.

The radicals $R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of
from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 45% by weight, in particular from 5 to 40% by weight, of n-butyl acrylate and/or 2-ethylhexyl acrylate.

Other preferred (meth)acrylates are the methyl, ethyl, propyl, isobutyl and tert-butyl esters.

Comonomers which may be used alongside these are vinyl esters and vinyl ethers.

The ethylene copolymers described above may be prepared by processes known per se, preferably by random copolymerization at high pressure and elevated temperature. Appropriate processes are well-known.

Other preferred elastomers are emulsion polymers whose preparation is described, for example, by Blackley in the monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

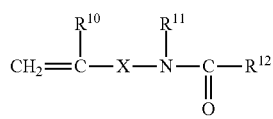

where the substituents can be defined as follows:
$R^{10}$ is hydrogen or a $C_1$-$C_4$-alkyl group,
$R^{11}$ is hydrogen, a $C_1$-$C_8$-alkyl group or an aryl group, in particular phenyl,
$R^{12}$ is hydrogen, a $C_1$-$C_{10}$-alkyl group, a $C_6$-$C_{12}$-aryl group, or —$OR^{13}$,
$R^{13}$ is a $C_1$-$C_8$-alkyl group or a $C_6$-$C_{12}$-aryl group, which can optionally have substitution by groups that comprise O or by groups that comprise N,
X is a chemical bond, a $C_1$-$C_{10}$-alkylene group, or a $C_6$-$C_{12}$-arylene group, or

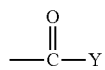

Y is O—Z or NH—Z, and
Z is a $C_1$-$C_{10}$-alkylene or $C_6$-$C_{12}$-arylene group.
The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

Instead of graft polymers whose structure has more than one shell, it is also possible to use homogeneous, i.e. single-shell, elastomers composed of 1,3-butadiene, isoprene and n-butyl acrylate or of copolymers of these. These products, too, may be prepared by concomitant use of crosslinking monomers or of monomers having reactive groups. Examples of preferred emulsion polymers are n-butyl acrylate-(meth)

acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubber listed above.

The thermoplastic molding compositions of the invention can comprise, as component C), conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, etc.

Examples of oxidation retarders and heat stabilizers are sterically hindered phenols and/or phosphites and amines (e.g. TAD), hydroquinones, aromatic secondary amines, such as diphenylamines, various substituted members of these groups, and mixtures of these, in concentrations of up to 1% by weight, based on the weight of the thermoplastic molding compositions.

UV stabilizers that may be mentioned, the amounts of which used are generally up to 2% by weight, based on the molding composition, are various substituted resorcinols, salicylates, benzotriazoles, and benzophenones.

Materials that can be added as colorants are inorganic pigments, such as titanium dioxide, ultramarine blue, iron oxide, and carbon black, and also organic pigments, such as phthalocyanines, quinacridones, perylenes, and also dyes, such as anthraquinones.

Materials that can be used as nucleating agents are sodium phenylphosphinate, aluminum oxide, silicon dioxide, and also preferably talc.

The thermoplastic molding compositions of the invention can be produced by processes known per se, by mixing the starting components in conventional mixing apparatus, such as screw-based extruders, Brabender mixers, or Banbury mixers, and then extruding the same. The extrudate can be cooled and pelletized. It is also possible to premix individual components and then to add the remaining starting materials individually and/or likewise in the form of a mixture. The mixing temperatures are generally from 230 to 320° C.

In another preferred mode of operation, components B) and also optionally C) can be mixed with a prepolymer, compounded, and pelletized. The resultant pellets are then solid-phase condensed under an inert gas continuously or batchwise at a temperature below the melting point of component A) until the desired viscosity has been reached.

The long glass fiber-reinforced polyamide molding compositions of the invention can be produced by the known processes for the production of elongate long-fiber-reinforced pellets, in particular via pultrusion processes, where the continuous fiber strand (roving) is completely saturated by the polymer melt and then cooled and chopped. The elongate long-fiber-reinforced pellets thus obtained, the pellet length of which is preferably from 3 to 25 mm, in particular from 5 to 14 mm, can be further processed to give moldings by the usual methods of processing (e.g. injection molding, compression molding).

The preferred L/D ratio of the pellets after pultrusion is from 2 to 8, in particular from 3 to 4.5.

Particularly good properties can be achieved in the molding by using non-aggressive processing methods. "Non-aggressive" in this context especially means substantial avoidance of excessive fiber breakage and the attendant severe reduction of fiber length. In the case of injection molding this means that it is preferable to use screws with large diameter and low compression ratio, in particular smaller than 2, and generously dimensioned nozzle channels and feed channels. A requirement supplementary to this is that high cylinder temperatures are used for rapid melting (contact heating) of the elongate pellets, and that the fibers are not excessively comminuted by overexposure to shear. When these measures are applied, the invention gives moldings which have higher average fiber length than comparable moldings produced from short-fiber-reinforced molding compositions. An additional improvement of properties is therefore achieved, in particular in tensile modulus of elasticity, ultimate tensile strength, and notched impact resistance.

The usual fiber length after processing of the molding, e.g. via injection molding, is from 0.5 to 10 mm, in particular from 1 to 3 mm.

The thermoplastic molding compositions of the invention feature good processability, in particular with welding methods such as vibration welding or laser welding, together with good mechanical properties, and also markedly improved weld line strength and surface, and also thermal stability.

These materials are suitable for the production of fibers, foils, and moldings of any type. Some examples follow: cylinder head covers, motorcycle covers, intake manifolds, charge-air-cooler caps, plug connectors, gearwheels, cooling-fan wheels, and cooling-water tanks.

In the electrical and electronic sector, improved-flow polyamides can be used to produce plugs, plug parts, plug connectors, membrane switches, printed circuit board modules, microelectronic components, coils, I/O plug connectors, plugs for printed circuit boards (PCBs), plugs for flexible printed circuits (FPCs), plugs for flexible integrated circuits (FFCs), high-speed plug connectors, terminal strips, connector plugs, device connectors, cable-harness components, circuit mounts, circuit-mount components, three-dimensionally injection-molded circuit mounts, electrical connectors, and mechatronic components.

Possible uses in automobile interiors are for dashboards, steering-column switches, seat components, headrests, center consoles, gearbox components, and door modules, and possible uses in automobile exteriors are for door handles, exterior-mirror components, windshield-wiper components, windshield-wiper protective housings, grilles, roof rails, sunroof frames, engine covers, cylinder-head covers, intake pipes (in particular intake manifolds), windshield wipers, and also external bodywork components.

Possible uses of improved-flow polyamides in the kitchen and household sector are for the production of components for kitchen devices, e.g. fryers, smoothing irons, knobs, and also applications in the garden and leisure sector, e.g. components for irrigation systems, or garden devices, and door handles.

EXAMPLES

I. Study of Various Iron Powders

The following components were used:
Component A/1
Nylon-6,6 with intrinsic viscosity IV of 148 ml/g, measured on a 0.5% strength by weight solution in 96% strength by weight sulfuric acid at 25° C. to ISO 307. (Ultramid® A27 from BASF SE was used.)

Component N2

Polyamide composed of m-xylylenediamine and adipic acid (molar ratio 1:1) with IV=65 ml/g (Ultramid® X17 from BASF SE)

Component A/3

PA6/66 (80:20) with IV 176 ml/g (Ultramid® C31-01)

Component A/4

PA 6 with IV 148 ml/g to ISO 307 (Ultramid® B27)

Component B/1

All iron powders have CAS No. 7439-89-6. For determination of Fe, C, N, and O content, see description pages 5 and 6.

| Fe | g/100 g | at least 97.7 | IR detection |
| C | g/100 g | at most 1.0 | IRS |
| N | g/100 g | at most 1.0 | TCD |
| O | g/100 g | at most 0.6 | IRS |

Particle size distribution: (laser scattering with Beckmann LS13320)
$d_{10}$ from 1.4 to 2.7 µm
$d_{50}$ from 2.9 to 4.2 µm
$d_{90}$ from 6.4 to 9.2 µm
BET surface area 0.44 m$^2$/g (DIN ISO 9277)

Component B/2

| Fe | g/100 g | min. 97.8 | |
| C | g/100 g | 0.6-0.9 | |
| N | g/100 g | 0.6-0.9 | |
| O | g/100 g | 0.45-0.65 | |
| Particle size distribution: | | | |
| $d_{10}$ | µm | max. 1.0 | |
| $d_{50}$ | µm | max. 2.0 | |
| $d_{90}$ | µm | max. 3.0 | |
| Tap density | g/cm$^3$ | 3.4-4.0 | Method based on ASTM B527 |

BET surface area: 0.93 m$^2$/g (DIN ISO 9277)

Component B/3

| Fe | g/100 g | min. 99.5 |
| C | g/100 g | max. 0.05 |
| N | g/100 g | max. 0.01 |
| O | g/100 g | max. 0.4 |
| SiO$_2$ coating | mg/kg | 0.08-0.12 |
| Tap density | g/cm$^3$ | 3.9-4.4 |
| Particle size distribution: | | |
| $d_{10}$ | µm | max. 3 |
| $d_{50}$ | µm | max. 6 |
| $d_{90}$ | µm | max. 12 |

BET surface area: 0.32 m$^2$/g (DIN ISO 9277)

Component B/4

| Fe | g/100 g | min. 97.2 |
| FePO$_4$ coating | g/100 g | ca. 0.5 |
| C | g/100 g | max. 1.1 |
| N | g/100 g | max. 1.2 |
| O | g/100 g | max. 0.6 |
| Particle size distribution: | | |
| $d_{50}$ | µm | 3.4-4.5 |

BET surface area: 0.44 m$^2$/g (DIN ISO 9277)

Component B/5

| Fe | g/100 g | min. 88 |
| C | g/100 g | 0.4-0.8 |
| O | g/100 g | max. 1.2 |
| N | g/100 g | max. 0.2 |
| P coating | g/100 g | 8.0-11.0 |
| Particle size distribution: | | |
| $d_{10}$ | µm | max. 3 |
| $d_{50}$ | µm | max. 6 |
| $d_{90}$ | µm | max. 18 |
| Tap density | g/cm$^3$ | 2.7-3.3 |

BET surface area: 0.89 m$^2$/g (DIN ISO 9277)

Component B/6

Masterbatch composed of 25% of B/1 in polyethylene

Component B/7

Masterbatch composed of 75% of B/1 in polyethylene

Component B/1 Comp

Shelfplus 02 2400 from Ciba Spezialitätenchemie GmbH (20% strength Fe powder masterbatch in polyethylene, $d_{50}$=30 µm)

BET surface area to DIN ISO 9277: 20 m$^2$/g

C content: 0.012 g/100 g

Component C/1

Glass fibers

Component C/2a

Calcium stearate

Component C/3

CuI/KI in ratio 1:4 (20 strength masterbatch in PA6)

Component C/4

40% strength PA6 masterbatch with nigrosin

Component C/5

Na pyrophosphate

Component C/6

NaCl

Component C/1 Comp

Fe$_2$O$_3$, spec. surface area to DIN 66131 (BET) from 6.8 to 9.2 m$^2$/g (Bayoxid E8708 from Lanxess)

Component C/2 Comp

Fe$_3$O$_4$, BET 0.23 m$^2$/g (Minelco Magni F50 from Minelco GmbH)

Component C/7

| Lupasol ® | WF |
| $M_w$ | 25 000 |
| Prim./sec./tert. amines | 1/1.2/0.76 |

Lupasol®=registered trademark of BASF SE

The primary/secondary/tertiary amines ratio was determined by means of $^{13}$C NMR spectroscopy.

The molding compositions were produced in a ZSK 30 with throughput 10 kg/h and a flat temperature profile at about 260° C.

The following measurements were made:
Tensile to ISO 527, mechanical properties prior to and after heat-aging at 220° C. in a convection oven;
IV: c=5 g/l in 96% strength sulfuric acid, to ISO 307

The injection pressure determined was the pressure at the changeover point during the injection molding process for tensile specimens to ISO 527.

The tables give the constitutions of the molding compositions and the results of the measurements.

TABLE 1

Constitutions

| Ex. | A/1 [% by wt.] | A/2 | A/3 | A/4 | C/2a | C/1 | C/4 | C/3 | C/5 | C/6 | C/7 |
|---|---|---|---|---|---|---|---|---|---|---|---|
| 1 | 67.76 | | | | 0.35 | 30 | 1.9 | | | | |
| 2 | 63.75 | | | | 0.35 | 30 | 1.9 | | | | |
| 3 | 66.76 | | | | 0.35 | 30 | 1.9 | | | | |
| 4 | 67.46 | | | | 0.35 | 30 | 1.9 | 0.3 | | | |
| 5 | 63.45 | | | | 0.35 | 30 | 1.9 | 0.3 | | | |
| 6 | 66.46 | | | | 0.35 | 30 | 1.9 | 0.3 | | | |
| 7 | 66.96 | | | | 0.35 | 30 | 1.9 | 0.3 | | | |
| 8 | 66.46 | | | | 0.35 | 30 | 1.9 | 0.3 | | | |
| 9 | 66.46 | | | | 0.35 | 30 | 1.9 | 0.3 | | | |
| 10 | 66.46 | | | | 0.35 | 30 | 1.9 | 0.3 | | | |
| 11 | 66.35 | | | | 0.35 | 30 | 1.9 | 0.3 | | | |
| 12 | 66.07 | | | | 0.35 | 30 | 1.9 | 0.3 | | | |
| 13 | 66.07 | | | | 0.35 | 30 | 1.9 | 0.3 | | | |
| 14 | 65.50 | | | | 0.35 | 30 | 1.9 | 0.3 | 0.5 | 0.5 | |
| 15 | 65.96 | | | | 0.35 | 30 | 1.9 | 0.3 | | | 0.5 |
| 16 | 66.46 | | | | 0.35 | 30 | 1.9 | 0.3 | | | 0.5 |
| 17 | 56.45 | | 10.0 | | 0.35 | 30 | 1.9 | 0.3 | | | |
| 18 | 46.45 | | 20.0 | | 0.35 | 30 | 1.9 | 0.3 | | | |
| 19 | 61.46 | 5.0 | | | 0.35 | 30 | 1.9 | 0.3 | | | |
| 20 | 63.46 | | | | 0.35 | 30 | 1.9 | 0.3 | | | |
| 21 | 66.12 | | | | 0.35 | 30 | 1.9 | 0.3 | | | |
| 22 | 56.45 | | | 10.0 | 0.35 | 30 | 1.9 | 0.3 | | | |
| 23 | 46.45 | | | 20.0 | 0.35 | 30 | 1.9 | 0.3 | | | |

| Ex. | B/1 comp | B/1 | B/2 | B/3 | B/4 | B/5 | C/1 comp | C/2 comp | B/6 | B/7 |
|---|---|---|---|---|---|---|---|---|---|---|
| 1 | | | | | | | | | | |
| 2 | 4.0 | | | | | | | | | |
| 3 | | 1.0 | | | | | | | | |
| 4 | | | | | | | | | | |
| 5 | 4.0 | | | | | | | | | |
| 6 | | 1.0 | | | | | | | | |
| 7 | | 0.5 | | | | | | | | |
| 8 | | | 1.0 | | | | | | | |
| 9 | | | | 1.0 | | | | | | |
| 10 | | | | | 1.0 | | | | | |
| 11 | | | | | | 1.1 | | | | |
| 12 | | | | | | | 1.4 | | | |
| 13 | | | | | | | | 1.4 | | |
| 14 | | 1.0 | | | | | | | | |
| 15 | | 1.0 | | | | | | | | |
| 16 | | 0.5 | | | | | | | | |
| 17 | | 1.0 | | | | | | | | |
| 18 | | 1.0 | | | | | | | | |
| 19 | | 1.0 | | | | | | | | |
| 20 | | | | | | | | | 4 | |
| 21 | | | | | | | | | | 1.3 |
| 22 | | 1.0 | | | | | | | | |
| 23 | | 1.0 | | | | | | | | |

Example 5 for comparison: WO 2005/7727 and WO 2006/74912 - examples 12 and 13 for comparison: EP 1846506

TABLE 2

Test results

| | Injection pressure | | Modulus of elasticity | | | | | | Tensile strength (tensile stress at break) | | | | | |
|---|---|---|---|---|---|---|---|---|---|---|---|---|---|---|
| Ex. | (bar) | IV | 0 h | 500 h | 750 h | 1000 h | 1250 h | 1500 h | 0 h | 500 h | 750 h | 1000 h | 1250 h | 1500 h |
| 1 | 391 | 153.9 | 9686 | 8564 | 5886 | 2968 | | | 188 | 82 | 42 | 9 | | |
| 2 | 394 | 155.8 | 9656 | 10680 | 10119 | 9139 | | | 185 | 98 | 86 | 78 | | |
| 3 | 387 | 157.9 | 9589 | 10092 | 9477 | 8067 | | | 182 | 161 | 133 | 109 | | |

TABLE 2-continued

Test results

| | | | | | | | | | | | | | | |
|---|---|---|---|---|---|---|---|---|---|---|---|---|---|---|
| 4 | 407 | 153.0 | 9663 | 9551 | 7386 | brittle | | | 191 | 97 | 55 | brittle | | |
| 5 | 417 | 144.8 | 9721 | 10764 | 9979 | 8202 | 7340 | 6090 | 190 | 94 | 76 | 76 | 76 | 71 |
| 6 | 369 | 148.0 | 9702 | 10721 | 10656 | 10342 | 10282 | 9607 | 183 | 159 | 151 | 151 | 142 | 125 |
| 7 | 394 | 149.0 | 9644 | 10689 | 10521 | 10514 | 10592 | 10119 | 188.5 | 160 | 151 | 148 | 149 | 140 |
| 8 | 340 | 149.2 | 9606 | 10509 | 10384 | 10156 | 10235 | 9714 | 182 | 159 | 154 | 148 | 144 | 131 |
| 9 | 341 | 124.7 | 9472 | 10528 | 10533 | 10619 | | | 180 | 151 | 147 | 138 | | |
| 10 | 354 | 145.6 | 9719 | 10743 | 10386 | 10280 | | | 186 | 164 | 154 | 150 | | |
| 11 | 321 | 134.2 | 9572 | 10491 | 10147 | 9871 | 9250 | 8448 | 175 | 165 | 153 | 133 | 119 | 102 |
| 12 | 346 | 146.7 | 9588 | 10248 | 9666 | Test not poss. | | | 168 | 137 | 120 | Test not poss. | | |
| 13 | 335 | 141.8 | 9695 | 10354 | 9934 | Test not poss. | | | 171.5 | 144 | 129 | Test not poss. | | |
| 14 | 267 | 143.3 | 10148 | 11055 | 10793 | 9858 | | | 190.5 | 104 | 94 | 88 | | |
| 15 | 268 | 136.2 | 9897 | 10865 | 10643 | 10726 | | | 177 | 132 | 127 | 109 | | |
| 16 | 273 | 129.3 | 10167 | 10966 | 10883 | 10453 | 10979 | 10900 | 184.5 | 136 | 137 | 133 | 132 | 139 |
| 17 | 347 | 138.9 | 9399 | 10497 | 10410 | 10435 | 10418 | 10611 | 175 | 163 | 166 | 125 | 168 | 173 |
| 18 | 354 | 139.6 | 9392 | 10291 | 10237 | 10272 | 10225 | 10277 | 171.5 | 167 | 169 | 129 | 171 | 171 |
| 19 | 321 | 128.1 | 10009 | 10902 | 10764 | 10492 | 10117 | 9719 | 191 | 176 | 170 | 133 | 144 | 127 |
| 20 | 373 | 128.1 | 9598 | 10340 | 10280 | 10123 | 9738 | 9623 | 172 | 158 | 133 | 102 | 133 | 127 |
| 21 | 365 | 144.2 | 9749 | 10490 | 10466 | 10341 | | | 182.5 | 161 | 147 | 100 | | |
| 22 | 314 | 142.2 | 9831 | 10927 | 10535 | 10774 | | 10640 | 185 | 180 | 178 | 178 | | 177 |
| 23 | 367 | 139.6 | 9665 | 10889 | 10658 | 10630 | | 10792 | 183 | 179 | 180 | 183 | | 185 |

Elongation at break (tensile strain at break)

| Ex. | 0 h | 500 h | 750 h | 1000 h | 1250 h | 1500 h |
|---|---|---|---|---|---|---|
| 1 | 3.6 | 1.2 | 1.0 | 0.4 | | |
| 2 | 3.2 | 1.3 | 1.0 | 1.1 | | |
| 3 | 3.3 | 2.2 | 1.2 | 1.7 | | |
| 4 | 3.6 | 1.2 | 1.8 | brittle | | |
| 5 | 3.2 | 1.3 | 1.0 | 1.3 | 1.3 | 1.3 |
| 6 | 3.4 | 1.9 | 1.8 | 1.8 | 1.7 | 1.6 |
| 7 | 3.5 | 2.0 | 1.8 | 1.8 | 1.7 | 1.6 |
| 8 | 3.3 | 2.0 | 1.9 | 1.9 | 1.8 | 1.7 |
| 9 | 3.5 | 1.9 | 1.9 | 1.7 | | |
| 10 | 3.3 | 2.1 | 1.9 | 1.9 | | |
| 11 | 3.0 | 2.1 | 1.9 | 1.7 | 1.6 | 1.5 |
| 12 | 2.6 | 1.7 | 1.5 | Test not poss. | | |
| 13 | 2.7 | 1.8 | 1.6 | Test not poss. | | |
| 14 | 2.9 | 1.4 | 1.3 | 1.3 | | |
| 15 | 2.6 | 1.4 | 1.4 | 1.2 | | |
| 16 | 2.7 | 1.5 | 1.5 | 1.3 | 1.5 | 1.6 |
| 17 | 3.4 | 2.1 | 2.2 | 1.4 | 2.3 | 2.4 |
| 18 | 3.5 | 2.2 | 2.3 | 1.5 | 2.6 | 2.6 |
| 19 | 3.1 | 2.1 | 2.1 | 1.5 | 1.8 | 1.6 |
| 20 | 3.1 | 2.1 | 1.7 | 1.1 | 1.7 | 1.7 |
| 21 | 3.2 | 2.0 | 1.8 | 1.1 | | |
| 22 | 3.4 | 2.3 | 2.4 | 2.3 | | 2.3 |
| 23 | 3.6 | 2.3 | 2.5 | 2.7 | | 2.6 |

II. PA 46 as Matrix

The components corresponded to part I, but PA 46 with IV: 151 ml/g (Stanyl® from DSM) was used as component A/5 and ethylenebisstearylamide was used as component C/2b.

TABLE 3

| Ex. No. | A/5 (%) | C/1 (%) | C/2b (%) | C/4 (%) | C/3 (%) | C/5 (%) | C/6 (%) | B/1 comp (%) | B/1 (%) |
|---|---|---|---|---|---|---|---|---|---|
| 1 comp | 64.46 | 30 | 0.34 | 1.9 | 0.3 | 0 | 0 | 3.0 | 0 |
| 1 | 65.75 | 30 | 0.34 | 1.9 | 0.3 | 0.5 | 0.46 | 0 | 0.75 |

TABLE 4

| | Heat-aging at 200° C. | | | | |
|---|---|---|---|---|---|
| Ex. No. | 0 h | 250 h | 750 h | 1250 h | 1500 h |
| | Modulus of elasticity | | | | |
| 1 comp | 9800 | 10 200 | 9900 | 9000 | 8800 |
| 1 | 10 000 | 10 500 | 10 000 | 8500 | 7900 |
| | Tensile strength (tensile stress at break) | | | | |
| 1 comp | 195 | 169 | 114 | 82 | 74 |
| 1 | 197 | 178 | 125 | 89 | 76 |
| | Elongation at break (tensile strain at break) | | | | |
| 1 comp | 3.0 | 2.1 | 1.3 | 1.0 | 1.0 |
| 1 | 2.7 | 2.2 | 1.5 | 1.3 | 1.4 |

TABLE 5

| | Heat-aging at 220° C. | | | | |
|---|---|---|---|---|---|
| Ex. No. | 0 h | 250 h | 750 h | 1250 h | 1500 h |
| | Modulus of elasticity | | | | |
| 1 | 9800 | 10 200 | 9900 | 9800 | 9800 |
| comp 1 | 10 000 | 10 400 | 10 500 | 10 300 | 10 500 |
| | Tensile strength (tensile stress at break) | | | | |
| 1 | 195 | 125 | 95 | 86 | 79 |
| comp 1 | 197 | 155 | 137 | 130 | 116 |
| | Elongation at break (tensile strain at break) | | | | |
| 1 | 3.0 | 1.5 | 1.2 | 1.1 | 1.0 |
| comp 1 | 2.7 | 1.8 | 1.6 | 1.4 | 1.3 |

III. Long-Glass Fiber-Reinforced Compositions

The components corresponded to I., but a glass fiber roving with Ø 17 μm was used as component C/8.

The molding compositions were produced as follows:

| 1) | Pultrusion conditions: | |
|---|---|---|
| | Temperature setting for extruder | 285° C. |
| | Impregnation chamber | 290° C. |
| | Preheating of roving | 180° C. |
| | Take-off speed | 9 to 12 m/min |
| | Pellet length | 12 mm |
| | Pellet L/D | 4 |
| 2) | Glass fiber L/D after injection molding | 120 |

The test specimens used for determination of properties were obtained by means of injection molding (injection temperature 280° C., melting point 80° C.).

TABLE 6

| Ex. No. | A/1 (%) | A/3 (%) | C/2a (%) | C/8 (%) | C/4 (%) | C/3 (%) | B/6 (%) |
|---|---|---|---|---|---|---|---|
| 1 | 33.45 | 10.0 | 0.35 | 50 | 1.9 | 0.3 | 4 |
| 2 comp | 37.45 | 10.0 | 0.35 | 50 | 1.9 | 0.3 | 0 |
| 3 | 53.45 | 10.0 | 0.35 | 30 | 1.9 | 0.3 | 4 |
| 4 comp | 57.45 | 10.0 | 0.35 | 30 | 1.9 | 0.3 | 0 |

TABLE 7

| | Heat aging at 200° C. | | | | | |
|---|---|---|---|---|---|---|
| Ex. No. | 0 h | 500 h | 1000 h | 1500 h | 2000 h | 2500 h |
| | Modulus of elasticity | | | | | |
| 1 | 16 051 | 17 235 | 16 698 | 16 835 | 16 096 | 16 118 |
| 2 comp | 16 425 | 17 335 | 16 998 | 16 844 | 15 160 | 11 538 |
| 3 | 10 274 | 11 156 | 10 728 | 10 888 | 10 294 | 10 475 |
| 4 comp | 10 122 | 11 472 | 10 970 | 10 363 | 8005 | Not measured |
| | Tensile strength (tensile stress at break) | | | | | |
| 1 | 243 | 212 | 245 | 208 | 203 | 192 |
| 2 comp | 268 | 188 | 232 | 178 | 128 | 84 |
| 3 | 180 | 167 | 179 | 174 | 167 | 155 |
| 4 comp | 187 | 176 | 166 | 115 | 58 | Not measured |
| | Elongation at break (tensile strain at break) | | | | | |
| 1 | 2.0 | 1.5 | 1.9 | 1.5 | 1.6 | 1.5 |
| 2V | 2.3 | 1.3 | 1.7 | 1.3 | 1.0 | 0.9 |
| 3 | 2.0 | 1.8 | 1.9 | 1.9 | 1.9 | 1.8 |
| 4V | 2.1 | 1.9 | 1.7 | 1.3 | 0.8 | Not measured |

TABLE 8

Heat aging at 220° C.

| Ex. No. | 0 h | 500 h | 1000 h | 1500 h | 2000 h | 2500 h |
|---|---|---|---|---|---|---|
| | | | Modulus of elasticity | | | |
| 1 | 16 051 | 16 958 | 17 419 | 16 142 | 16 984 | 15 707 |
| 2 comp | 16 425 | 17 475 | 10 750 | 836 | Not measured | Not measured |
| 3 | 10 274 | 10 648 | 11 106 | 11 001 | 10 922 | 10 393 |
| 4 comp | 10 122 | 11 094 | 10 465 | 5932 | Not measured | Not measured |
| | | Tensile strength (tensile stress at break) | | | | |
| 1 | 243 | 260 | 218 | 228 | 178 | 114 |
| 2 comp | 268 | 249 | 53 | 0.9 | Not measured | Not measured |
| 3 | 180 | 179 | 169 | 170 | 152 | 112 |
| 4 comp | 187 | 181 | 115 | 45 | Not measured | Not measured |
| | | Elongation at break (tensile strain at break) | | | | |
| 1 | 2.0 | 2.1 | 1.6 | 1.8 | 1.2 | 0.8 |
| 2 comp | 2.3 | 1.9 | 0.6 | 0 | Not measured | Not measured |
| 3 | 2.0 | 1.9 | 1.8 | 1.8 | 1.6 | 1.2 |
| 4 comp | 2.1 | 1.9 | 1.3 | 0.9 | Not measured | Not measured |

IV. Vibration Welding

The components used were the same as in I.

TABLE 9

| Ex. No. | A/1 (%) | A/3 (%) | C/1 (%) | C/2a (%) | C/4 (%) | C/3 (%) | B/1 (%) |
|---|---|---|---|---|---|---|---|
| 1 comp | 67.45 | 0 | 30 | 0.35 | 1.9 | 0.3 | 0 |
| 1 | 66.45 | 0 | 30 | 0.35 | 1.9 | 0.3 | 1.0 |
| 2 | 46.45 | 20 | 30 | 0.35 | 1.9 | 0.3 | 1.0 |

TABLE 10

Vibration-welded moldings
Mechanical properties after heat-aging at 220° C.

| Ex. No. | 0 h | 500 h | 1000 h |
|---|---|---|---|
| | Tensile strength (MPa) (tensile stress) | | |
| 1 comp | 77 | 24 | 3 |
| 1 | 78 | 26 | 15 |
| 2 | 77 | 55 | 35 |
| | Bending strength (MPa) (flexural stress) | | |
| 1 comp | 127 | 38 | 1 |
| 1 | 126 | 51 | 26 |
| 2 | 136 | 115 | 102 |

Description of Test: Vibration Welding of Engineering Plastics

Test Specimens

Test specimens in the form of sheets are used in order to study the effect of material on the welding process and the quality of the joint. Use of a film gate across the entire width of the injection molding achieves uniform melt orientation and avoids inhomogeneity. The thickness of the injection-molded sheets is 4 mm, and the sprue region is removed by sawing so that the dimensions of the sheets are 110 mm×110 mm. A circular saw is then used to halve the sheets in the direction of injection, giving them final dimensions of about 55 mm×110 mm. In the welding processes that follow, the external (unsawn) edges are welded. The resultant joint area is 440 mm². The standard sheet serves as geometrically simple test specimen for analyzing effects of materials and/or of parameters on the quality of the joint. The simple shape of the sheet permits secure fixing in the welding tool, because the entire length is supported on both sides in the tool.

Welding Machine

An M-102 H ultrasound vibration welding machine from Branson is used to carry out the welding tests.

Welding Process

The form of vibration used to weld the sheets is "linear-longitudinal". The mode used for the vibration welding studies is "displacement-controlled welding with constant pressure level". The tests take place at constant amplitude of 0.9 mm and constant welding pressure of 1.6 MPa. Vibration frequency used is the resonance frequency, which is about 220 Hz. Two welding tests are carried out for each parameter/material setting.

Mechanical Testing

The flat specimens needed for the tensile and flexural tests are cut with a circular saw to a width of 25 mm perpendicularly with respect to the welded area. Three specimens of a welded sheet of each parameter/material setting are tested. The welding bead is not removed here.

V: Semiaromatic Polyamide (6T/6I/MXD.T/I)

TABLE 11

| Ex. | A/6 | A/4 | B/1 | C/1 | C/2 | C/3 | C/4 | C/5 | C/6 | C/7 | C/8 | C/9 |
|---|---|---|---|---|---|---|---|---|---|---|---|---|
| 1 | 64.10 | | | 35.00 | 0.05 | 0.35 | | | | | | 0.50 |
| 2 | 58.85 | | | 35.00 | 0.05 | 0.35 | 1.25 | 4.00 | | | | 0.50 |
| 3 | 59.45 | | | 35.00 | 0.05 | 0.35 | | 4.00 | 0.65 | | | 0.50 |
| 4 | 59.80 | | | 35.00 | 0.05 | 0.35 | | 4.00 | | | 0.30 | 0.50 |
| 5 | 49.80 | 10.00 | | 35.00 | 0.05 | 0.35 | | 4.00 | | | 0.30 | 0.50 |
| 6 | 55.80 | | 4.00 | 35.00 | 0.05 | 0.35 | | 4.00 | | | 0.30 | 0.50 |
| 7 | 45.80 | 10.00 | 4.00 | 35.00 | 0.05 | 0.35 | | 4.00 | | | 0.30 | 0.50 |
| 8 | 45.30 | 10.00 | 4.00 | 35.00 | 0.05 | 0.35 | | 4.00 | 0.50 | | 0.30 | 0.50 |

A/6

Semiaromatic polyamide based on 6.T/6.I/MXD.T/I having 64% by wt. of 6.T units, 29% by wt. of 6.I and 7% by wt. of MXD.T/MXD.I units. IV measured on the base polymer: 90 ml/g (0.5% by wt. in 96% sulfuric acid at 25° C., ISO 307).

T = terephthalic acid

I = isophthalic acid

MXD = m-xylylenediamine

A/4 (see I.)

Nylon-6 with IV 148 ml/g (ISO 307; Ultramid ® B27).

B/1

Masterbatch made of 25% by wt. of B/1 (see I.) in nylon-6,6.

C/1

Glass fibers with 10 μm average diameter

C/2

Talc powder

C/3

Partially oxidized polyethylene wax (acid number 15-19 mg KOH/g; melt viscosity at 120° C.: 350-470 mm$^2$/s ((DGF M-III 8); Luwax ® OA5)

C/4

Mixture of various additives (parts based on weight):

1 part of N,N'-hexane-1,6-dihylbis(3-(3,5-di-tert-butyl-4-hydroxyphenylpropionamide)) (Irganox ® 1098), 1 part of high-molecular-weight hindered amine having the following structure (Chimassorb ® 2020):

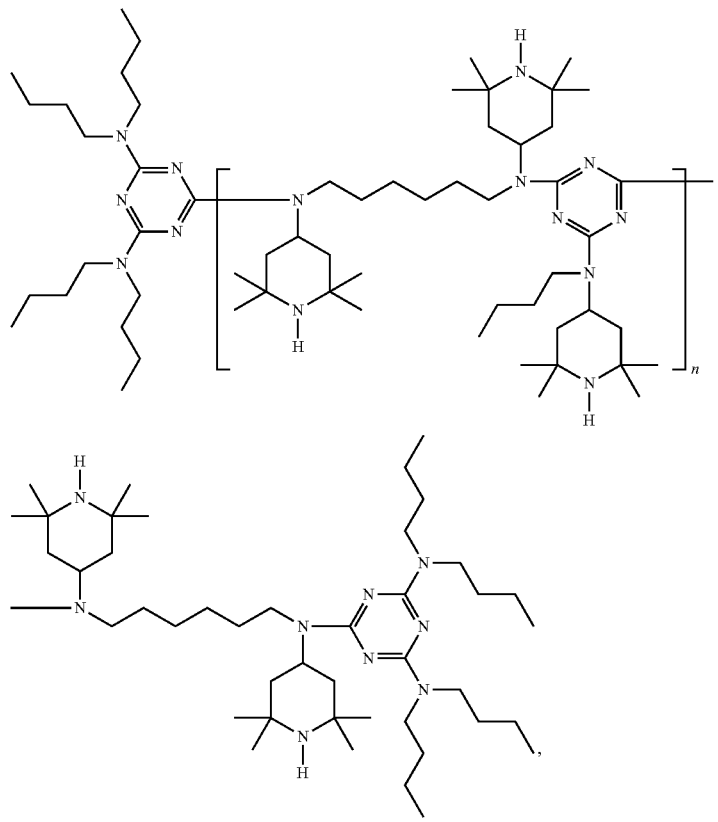

TABLE 11-continued

| | | | Constitutions (% by wt.) | | | | | | |
|---|---|---|---|---|---|---|---|---|---|
| Ex. | A/6 | A/4 | B/1 | C/1 | C/2 | C/3 | C/4 | C/5 | C/6 | C/7 | C/8 | C/9 |

1 part of 2,2'-methylene bis(6-(2H-benzotriazol-2-yl)-4-1,1,3,3-tetramethylbutyl)phenol) (Tinuvin ® 360),
4 parts of a carbon black masterbatch (30% by weight in LDPE)
C/5
Ethylene-butyl acrylate rubber, functionalized with maleic anhydride (Fusabond ® NM 598D)
C/6
4,3'-Bis(alpha, alpha-dimethylbenzyl)diphenylamine (Naugard ® 445)
C/7
Polyethyleneimine with Mw~25 000 g/mol and with a ratio of primary:secondary:tertiary amine of 1:1.20:0.76 (Lupasol ® WF)
C/8
CuI/KI in a ratio of 1:4
C/9
Calcium montanate

TABLE 12

Heat-aging in convection oven at 235° C.

Relative change in weight of a tensile specimen in comparison with initial value (0 h)/%

| Ex. No. | 0 h | 250 h | 500 h | 750 h | 1000 h |
|---|---|---|---|---|---|
| 1 | 100 | 90.6 | 77.0 | 65.8 | 64.0 |
| 2 | 100 | 97.8 | 90.1 | 79.0 | 68.9 |
| 3 | 100 | 95.5 | 91.7 | 68.5 | 64.6 |
| 4 | 100 | 97.2 | 90.1 | 79.7 | 71.8 |
| 5 | 100 | 97.1 | 96.1 | 93.7 | 90.2 |
| 6 | 100 | 98.5 | 96.5 | 91.2 | 85.0 |
| 7 | 100 | 99.5 | 97.8 | 97.4 | 96.9 |
| 8 | 100 | 98.0 | 97.9 | 97.4 | 96.9 |

Modulus of elasticity/MPa

| Ex. No. | 0 h | 250 h | 500 h | 750 h | 1000 h |
|---|---|---|---|---|---|
| 1 | 13 300 | 14 000 | —[a] | —[a] | —[a] |
| 2 | 12 700 | 12 640 | —[a] | —[a] | —[a] |
| 3 | 12 000 | 12 300 | —[a] | —[a] | —[a] |
| 4 | 11 900 | 12 530 | 12 750 | 12 520 | —[a] |
| 5 | 11 900 | 12 240 | 13 230 | 12 760 | 12 870 |
| 6 | 11 000 | 11 700 | 12 080 | 10 970 | 10 840 |
| 7 | 10 900 | 11 740 | 12 700 | 11 990 | 11 850 |
| 8 | 10 900 | 11 780 | 12 570 | 11 960 | 11 800 |

[a]Highly aged tensile specimens break even at low pressure; no measurement possible Tensile strength/MPa

| Ex. No. | 0 h | 250 h | 500 h | 750 h | 1000 h |
|---|---|---|---|---|---|
| 1 | 194 | 70 | —[a] | —[a] | —[a] |
| 2 | 186 | 92 | —[a] | —[a] | —[a] |
| 3 | 209 | 60 | —[a] | —[a] | —[a] |
| 4 | 205 | 98 | 56 | 45 | —[a] |
| 5 | 210 | 126 | 124 | 114 | 105 |
| 6 | 170 | 147 | 131 | 93 | 81 |
| 7 | 188 | 207 | 212 | 202 | 198 |
| 8 | 187 | 202 | 218 | 206 | 198 |

[a]Highly aged tensile specimens break even at low pressure; no measurement possible Tensile strain at break/%

| Ex. No. | 0 h | 250 h | 500 h | 750 h | 1000 h |
|---|---|---|---|---|---|
| 1 | 2.1 | 0.5 | —[a] | —[a] | —[a] |
| 2 | 1.8 | 0.8 | —[a] | —[a] | —[a] |
| 3 | 2.3 | 0.5 | —[a] | —[a] | —[a] |
| 4 | 2.3 | 0.9 | 0.5 | 0.4 | —[a] |
| 5 | 2.4 | 1.2 | 1.2 | 1.1 | 1.1 |
| 6 | 1.9 | 1.4 | 1.3 | 0.9 | 0.9 |
| 7 | 2.4 | 2.2 | 2.2 | 2.1 | 2.1 |
| 8 | 2.3 | 2.1 | 2.3 | 2.2 | 2.0 |

[a]Highly aged tensile specimens break even at low pressure; no measurement possible Impact resistant (Charpy, without notch)/kJ/m$^2$

| Ex. No. | 0 h | 250 h | 500 h | 750 h | 1000 h |
|---|---|---|---|---|---|
| 1 | 40 | —[a] | —[a] | —[a] | —[a] |
| 2 | 42 | 12 | —[a] | —[a] | —[a] |
| 3 | 59 | 6 | —[a] | —[a] | —[a] |
| 4 | 58 | 15 | 7 | 4 | —[a] |
| 5 | —[b] | —[b] | —[b] | —[b] | —[b] |
| 6 | 60 | 31 | 22 | 19 | —[a] |
| 7 | 58 | 51 | 61 | 58 | 65 |
| 8 | 59 | 41 | 66 | 61 | 44 |

[a]Highly aged specimens break even at low pressure; no measurement possible
[b]Not tested

The invention claimed is:

1. A thermoplastic molding composition comprising
A) from 10 to 99.999% by weight of a polyamide,
B) from 0.001 to 20% by weight of iron powder with a particle size of at most 10 μm ($d_{50}$ value), which is obtained via thermal decomposition of pentacarbonyliron and has a specific BET surface area of from 0.1 to 5 m$^2$/g to DIN ISO 9277,
C) from 0 to 70% by weight of further additives,
where the total of the percentages by weight of components A) to C) does not exceed 100%.

2. The thermoplastic molding composition according to claim 1, in which component B) has a $d_{10}$ value of from 1 to 5 μm.

3. The thermoplastic molding composition according to claim 1, in which component B) has a $d_{90}$ value of from 3 to 35 μm.

4. The thermoplastic molding composition according to claim 2, in which component B) has a C content of from 0.05 to 1.2 g/100 g (according to ASTM E1019).

5. The thermoplastic molding composition according to claim 1, in which component B) has a tap density of from 2.5 to 5 g/cm$^3$.

6. The thermoplastic molding composition according to claim 2, in which component B) has a $d_{90}$ value of from 3 to 35 μm, a tap density of from 2.5 to 5 g/cm$^3$ and component B) has a C content of from 0.05 to 1.2 g/100 g (according to ASTM E1019).

7. The thermoplastic molding composition according to claim 2, in which component B) has been coated with iron phosphate, iron phosphide, or $SiO_2$, on the surface of the particles.

8. The thermoplastic molding composition according to claim 6, in which component B) has been coated with iron phosphate, iron phosphide, or $SiO_2$, on the surface of the particles.

9. A process for the production of fibers, foils, and moldings which comprises utilizing the thermoplastic molding composition according to claim 1.

10. A process for the production of moldings via vibration welding or laser welding which comprises utilizing the thermoplastic molding composition according to claim 1.

11. A fiber, a foil, or a molding, obtained from the thermoplastic molding composition according to claim 1.

* * * * *